(12) United States Patent
Urbanek et al.

(10) Patent No.: US 11,971,083 B2
(45) Date of Patent: Apr. 30, 2024

(54) OPTIMIZED PIN JOINT GEOMETRY

(71) Applicant: IWIS MOTORSYSTEME GMBH & CO. KG, Munich (DE)

(72) Inventors: Andreas Urbanek, Munich (DE); Andreas Ritz, Munich (DE); Bahram Khani, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 224 days.

(21) Appl. No.: 17/615,824

(22) PCT Filed: Jun. 4, 2020

(86) PCT No.: PCT/EP2020/065474
§ 371 (c)(1),
(2) Date: Dec. 1, 2021

(87) PCT Pub. No.: WO2020/245265
PCT Pub. Date: Dec. 10, 2020

(65) Prior Publication Data
US 2022/0325779 A1    Oct. 13, 2022

(30) Foreign Application Priority Data
Jun. 4, 2019   (EP) ..................................... 19178202

(51) Int. Cl.
*F16G 13/06* (2006.01)
(52) U.S. Cl.
CPC .................................. *F16G 13/06* (2013.01)
(58) Field of Classification Search
CPC ........... B21L 9/065; F16G 13/06; F16G 13/02
USPC ......................................... 474/206, 232, 234
See application file for complete search history.

(56) References Cited

U.S. PATENT DOCUMENTS

| | | | | |
|---|---|---|---|---|
| 1,152,476 A | * | 9/1915 | Bixby | ..................... F16G 13/02 305/59 |
| 1,193,550 A | * | 8/1916 | Hovland | .................. F16G 13/06 411/513 |
| 1,859,503 A | * | 5/1932 | Fahrenwald | ............ B21L 15/00 29/527.5 |
| 2,424,087 A | * | 7/1947 | Focke | ..................... F16G 13/06 29/90.01 |

(Continued)

FOREIGN PATENT DOCUMENTS

| | | |
|---|---|---|
| CN | 203348434 U | 12/2013 |
| CN | 204083059 U | 1/2015 |

(Continued)

*Primary Examiner* — Henry Y Liu
(74) *Attorney, Agent, or Firm* — BakerHostetler

(57) ABSTRACT

A chain for a chain drive includes alternating inner chain links and outer chain links, which are connected together in an articulated manner by means of a respective chain joint. Each outer chain link includes two outer plates, each of which comprises two openings and two pins, and the pins and openings are connected together by means of a respective compression connection such that the pins hold the outer plates at a distance from each other. The chain for a chain drive prevents the disadvantages known from the prior art and leading in particular to a higher fatigue strength. This is achieved in that a beveled joint is formed in the region of the compression connection between the pins and the openings in the outer plates.

15 Claims, 3 Drawing Sheets

(56) References Cited

U.S. PATENT DOCUMENTS

| | | | | |
|---|---|---|---|---|
| 2,431,702 A * | 12/1947 | McCann | F16G 13/06 | 59/8 |
| 3,127,980 A * | 4/1964 | Lanham | F16G 13/07 | 198/850 |
| 3,379,072 A * | 4/1968 | Kuntzmann | F16G 13/06 | 474/218 |
| 3,439,494 A * | 4/1969 | Gettmann | F16G 13/06 | 59/85 |
| 3,679,265 A * | 7/1972 | Krekeler | E21C 25/34 | 299/84.1 |
| 3,826,150 A * | 7/1974 | Palmaer | F16G 13/06 | 474/234 |
| 4,123,947 A * | 11/1978 | Smith | F16G 13/06 | 59/9 |
| 4,220,052 A * | 9/1980 | Sheldon | F16G 13/06 | 198/853 |
| 4,271,663 A * | 6/1981 | Templin | F16G 15/00 | 59/84 |
| 4,704,098 A * | 11/1987 | Tsubakimoto | F16G 13/08 | 474/206 |
| 4,886,485 A * | 12/1989 | Bartoletto | F16G 13/07 | 474/234 |
| 4,983,147 A * | 1/1991 | Wu | F16G 13/06 | 474/212 |
| 4,998,907 A * | 3/1991 | Sawada | B21L 9/065 | 474/206 |
| 5,073,153 A * | 12/1991 | Wu | F16G 13/06 | 474/212 |
| 5,176,587 A * | 1/1993 | Mott | F16G 13/06 | 474/216 |
| 5,224,904 A * | 7/1993 | Ono | F16G 15/00 | 474/225 |
| 5,346,006 A * | 9/1994 | Wu | F16G 13/06 | 474/212 |
| 5,376,055 A * | 12/1994 | Bauman | F16G 13/06 | 474/225 |
| 5,787,700 A * | 8/1998 | Tanaka | F16G 13/06 | 59/8 |
| 5,943,855 A * | 8/1999 | Morimoto | F16G 13/06 | 59/5 |
| 6,074,318 A * | 6/2000 | Tanaka | F16G 13/06 | 474/161 |
| 6,302,818 B1 * | 10/2001 | Haight | F16G 13/06 | 474/230 |
| 6,364,799 B1 * | 4/2002 | Campagnolo | F16G 13/06 | 474/227 |
| 2002/0173395 A1 * | 11/2002 | Reiter | F16G 13/06 | 474/230 |
| 2005/0266949 A1 * | 12/2005 | Kamada | F16G 13/06 | 474/230 |
| 2006/0079365 A1 * | 4/2006 | Fink | F16G 13/06 | 474/230 |
| 2008/0015071 A1 * | 1/2008 | Fujiwara | F16G 13/06 | 474/206 |
| 2008/0015072 A1 * | 1/2008 | Nagao | F16G 13/06 | 474/206 |
| 2009/0258742 A1 * | 10/2009 | Valle | F16G 13/06 | 474/228 |
| 2009/0301842 A1 * | 12/2009 | Ono | F16G 13/06 | 198/500 |
| 2010/0137088 A1 * | 6/2010 | Ohsawa | F16G 13/06 | 474/206 |
| 2010/0304906 A1 * | 12/2010 | Ohsawa | F16G 13/06 | 474/91 |
| 2012/0088619 A1 * | 4/2012 | Adel | B21L 9/02 | 59/8 |
| 2013/0190121 A1 * | 7/2013 | Skipper | F16G 13/06 | 474/206 |
| 2013/0203538 A1 * | 8/2013 | Miyanaga | F16G 13/04 | 474/213 |
| 2013/0225345 A1 * | 8/2013 | Bodensteiner | F16G 13/06 | 59/35.1 |
| 2014/0038759 A1 * | 2/2014 | Inoue | B21L 9/065 | 474/234 |
| 2015/0233447 A1 * | 8/2015 | Poiret | C23C 10/60 | 427/250 |
| 2015/0260258 A1 * | 9/2015 | Kubota | F16G 13/06 | 474/227 |
| 2016/0040753 A1 * | 2/2016 | Wang | F16G 13/06 | 474/226 |
| 2016/0169324 A1 * | 6/2016 | Wu | F16G 13/07 | 474/206 |
| 2017/0067535 A1 * | 3/2017 | Fukumori | F16G 13/06 | |

FOREIGN PATENT DOCUMENTS

| | | |
|---|---|---|
| CN | 106499772 A | 3/2017 |
| DE | 20314167 U1 | 11/2003 |
| FR | 2 792 385 A1 | 10/2000 |
| GB | 588483 A | 5/1947 |
| JP | 2011-94660 A | 5/2011 |
| WO | 03/091599 A1 | 11/2003 |
| WO | 2017/041797 A1 | 3/2017 |

* cited by examiner

OPTIMIZED PIN JOINT GEOMETRY

CROSS-REFERENCE TO RELATED APPLICATIONS

This application is a National Stage of International patent application PCT/EP2020/065474, filed on Jun. 4, 2020, which claims priority to foreign European patent application No. EP 19178202.8, filed on Jun. 4, 2019, the disclosures of which are incorporated by reference in their entirety.

The present invention relates to a chain for a chain drive having alternating inner chain links and outer chain links, each of which is articulated to one another by means of a chain joint, each outer chain link including two outer link plates each having two openings and two pins, and the pins and the openings each being connected to one another by means of a compression connection so that the pins hold the outer link plates at a distance from each other.

BACKGROUND

Such chains are used to carry stationary and swaying loads as drive, transport or conveyor chains at low and medium chain speeds and as transmission chains at high chain speeds for power transmission between shafts with parallel axes. These chains are used throughout the mechanical engineering industry and are used, among other things, in machine tool construction, in printing machines, in the textile and packaging industry, in transport and conveyor technology, in agricultural machinery and construction technology, in hydraulic engineering, mining and metallurgical operations, and in motor vehicle and engine construction.

Preferably, such chains may be configured as sleeve or roller chains. Such chains are composed of inner chain links and outer chain links, each inner chain link of a roller chain having two inner link plates with two openings each, two sleeves pressed into the openings of the inner link plates and two rollers rotatably arranged on the sleeves. In the case of sleeve chains, the two rollers are dispensed with so that sleeves of correspondingly larger diameter engage directly with the sprocket. An outer chain link includes two outer link plates, each also with two openings, and two pins that are press-fitted into the openings of the outer link plates. The press fit or interference fit between the pins and the openings of the outer link plates is significantly higher than is usual in the mechanical engineering sector. The outer chain links are offset from the inner chain links, with the pins of the outer chain links passing through the sleeves of the inner chain links so that the pins of the outer chain links and the sleeves of the inner chain links form chain joints.

In almost all chain applications, each chain link passes through load and return strands and is thus subject to changing stress or tension conditions. This is therefore a dynamic or periodically changing load. An essential value for the design of chains is therefore the fatigue strength. In the load range below the fatigue strength, in the course of use, i.e. preferably during the service life of the motor, a chain may be operated without failing caused by component failure due to breakage.

Despite the high interference fit between the pins and the openings in the outer link plates, it has been shown that the fatigue strength of chains is not always adequate. Contrary to expectations, the fatigue strength is lower at higher excess of the interference fit between pins and openings in the outer link plates than at low excess of the interference fit.

SUMMARY OF THE INVENTION

It is therefore the object of the present invention to provide a chain for a chain drive, while avoiding the disadvantages known from the prior art and, in particular, resulting in higher fatigue strength.

According to the invention, this object is solved by forming a joining chamfer in the area of the compression connection between the pins and the openings in the outer link plates.

As already described, in the case of chains the interference fits formed between pins and openings in the link plate lugs are very high and also significantly higher than is usual in the mechanical engineering sector. The minimum interference fit between pins and openings in the outer link plates, referred to as the diameter, already corresponds to 1.5 times the maximum related excess of interference fit in general mechanical engineering. The comparison of the maximum related excess of interference fits results in a factor >4. It has been shown that chips may occur in the assembly of the outer links when joining outer links and pins. The simulation of the joining process shows significant plastic deformation in the area of the openings of the outer link plates. This leads to a change of the pressure between the pins and the openings in the outer link plates. Due to the plastic deformation, the resulting compression between the pins and the openings in the outer link plates differs considerably from the ideal condition aimed for. In certain areas of the interference fit, only a very small compression is achieved. The joining chamfer in the area of the interference fit between the pins and the openings in the outer link plates facilitates centering between the pins and the openings during joining and reduces or avoids plastic deformation in the area of the openings in the outer link plates. As a result, an interference fit is achieved, which leads to a more uniform and high pressure between the pin and the plate and thus to the desired fatigue strength.

In one variant, it may be provided that the joining chamfer is part of the interference fit between the pins and the openings in the outer link plates. The joining chamfer is thus formed in the area where the interference fit is actually realized. This prevents unwanted plastic deformation in the entry area of the openings in the outer link plates. The joining chamfer may nevertheless extend in one or both directions beyond the interference fit.

In a simple embodiment, it may be provided that the joining chamfer is formed on the pins. The joining chamfer is a reduction of the outer diameter of the pin. This joining chamfer may be easily produced on the pin. However, it would also be conceivable for the openings in the outer link plates to have a joining chamfer.

Preferably, the length of the joining chamfer may be about 0.4 to 2.5 mm, preferably 0.6 to 1.5 mm. It has been shown that a length in the specified range enables good assembly and it is nevertheless ensured that a sufficiently high interference fit is achieved between the pin and the openings in the outer link plates, thereby resulting in good fatigue strength. Also in the case of industrial chains, the formation of joining chamfers in the area of the interference fit between the openings in the link plates and the pins may be advantageous. Here, the length of the joining chamfer may then be greater than specified above, since the link plate width may also be significantly greater.

Furthermore, it may be provided that the length of the joining chamfer corresponds approximately to the thickness of the outer link plates. In this case, the chamfer is formed only in the area where a press-fit connection is actually formed between the pins and the openings in the outer link plates. The other areas of the pins, in particular the central area which, together with the sleeves of the inner chain links, forms the chain link, are not modified.

Particularly preferably, each pin has a joining chamfer at both ends. Thus, a good fit between the pins and the outer link plates is achieved at all openings of the outer link plates, and thus the required fatigue strength is achieved.

According to a further variant, it may be provided that the chamfer angle of the joining chamfer is approximately 0.3° to 2°, preferably 0.5° to 1°. In the present case, the chamfer angle is the angle between the extension of the lateral surface of the cylindrical central part of the pin and the circumferential surface of the joining chamfer. It has been shown that chamfer angles in these ranges produce a particularly advantageous effect, i.e. good fatigue strength of the outer link plates with simultaneous good hold of the interference fit between the pin and the openings of the outer link plates.

Simple manufacturability of the joining chamfer may be achieved by having the joining chamfer to extend linearly. That is, the joining chamfer is then cone-shaped, thus has the shape of a straight circular truncated cone. This enables easy assembly of the chain.

However, it may also be provided that the joining chamfer extends progressively or degressively. This may improve the interference fit between the pins and the outer link plates.

Advantageously, the pins may be rounded at both ends at the transition from their end faces to their circumferential surface. This simplifies assembly or centering and insertion of the pins into the plate eyes. Preferably, the radius is about 0.4 mm.

Furthermore, the invention also relates to a pin for a chain described above. Here, too, the object of the present invention is to provide a pin that allows easy assembly of the chain described above and leads to a high fatigue strength of the chain. According to the invention, this object is solved in that joining chamfers are formed at both ends of the pin. Typically, it is advantageous if the joining chamfers at both ends of the pin are identical to one another, but it is also conceivable to form the joining chamfers differently and, if necessary, randomly, i.e. according to a random principle. The joining chamfers further have the features described above.

BRIEF DESCRIPTION OF THE DRAWINGS

The invention is described in more detail below with reference to Figures. In the Figures.

DETAILED DESCRIPTION

Figure 1:
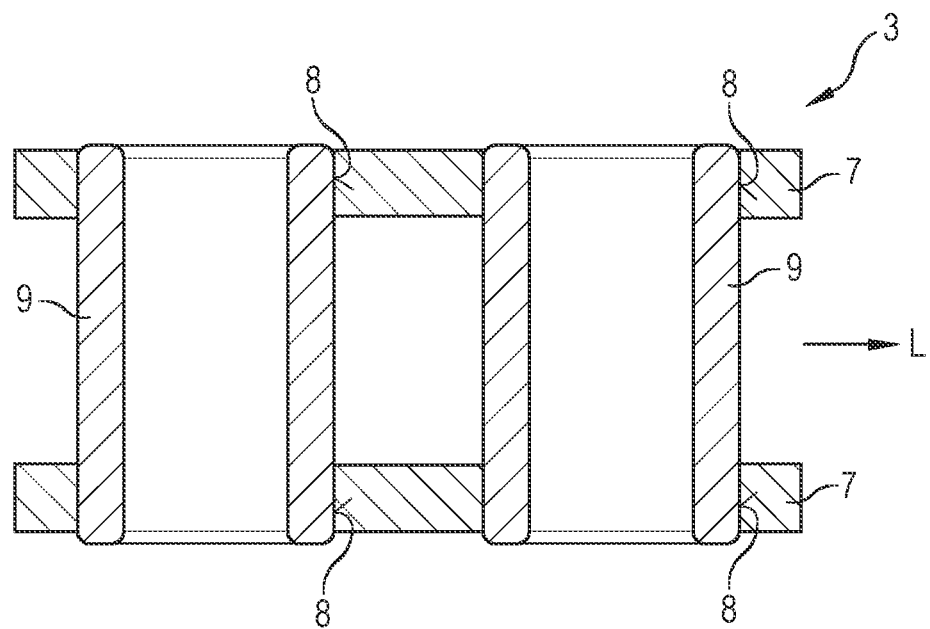
FIG. 1: shows a section through an inner chain link of a sleeve chain.

FIG. 1 shows one of the inner chain links 3 of a sleeve chain. Each inner chain link 3 includes two inner link plates 7, each having two openings 8. The two inner link plates 7 of each inner chain link 3 are aligned in the longitudinal direction L of the chain 1. Sleeves 9 are pressed into the openings 8 of the inner chain links 3. The inner link plates 7 are each arranged on the ends of the sleeves 9, so that the inner link plates 7 are held at a distance from one another by the sleeves 9 transversely to the longitudinal direction L of the chain 1.

Figure 2:
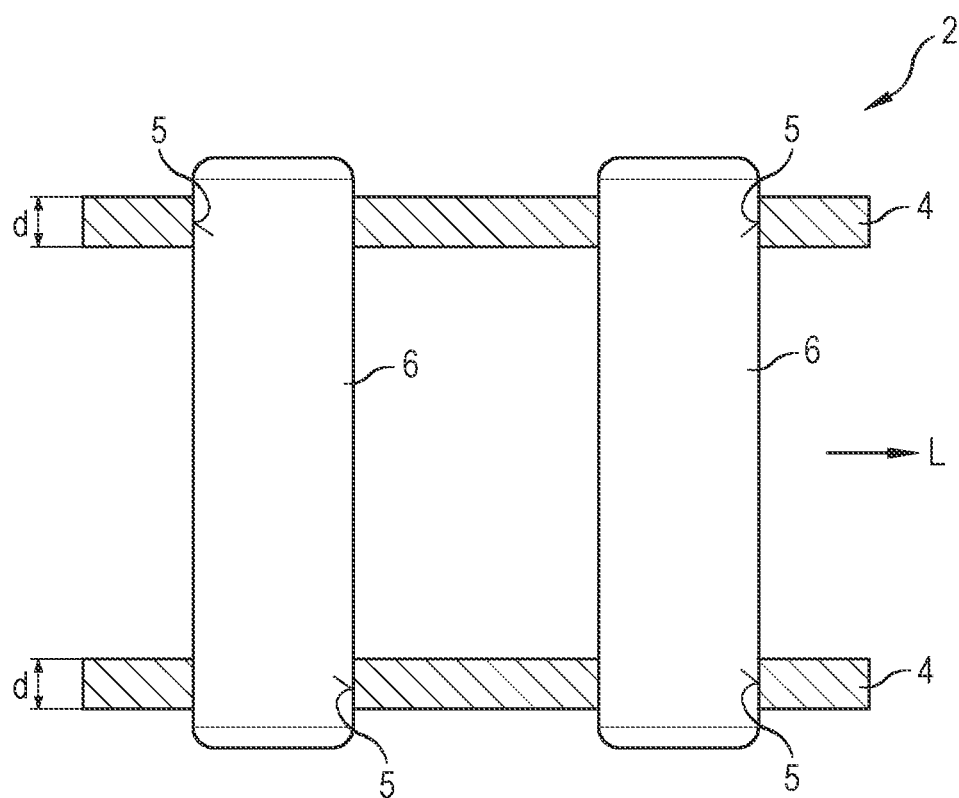
FIG. 2: shows a section through an outer chain link of a sleeve chain.

In FIG. 2, one of the outer chain links 2 of a sleeve chain is shown. Each outer chain link 2 includes two outer link plates 4 arranged parallel to each other, each having two openings 5. The outer link plates 4 have a thickness d. Pins 6 are pressed into the openings 5 of the outer link plates 4, so that a compression connection 11 is formed between the openings 5 and the pins 6, in the region, in which the pins 6 are arranged in the openings 5. The outer link plates 4 are each arranged at the ends of the pins 6, so that the pins 6 hold the outer link plates 4 at a distance from one another transversely to the longitudinal direction L of the chain 1.

Figure 3:
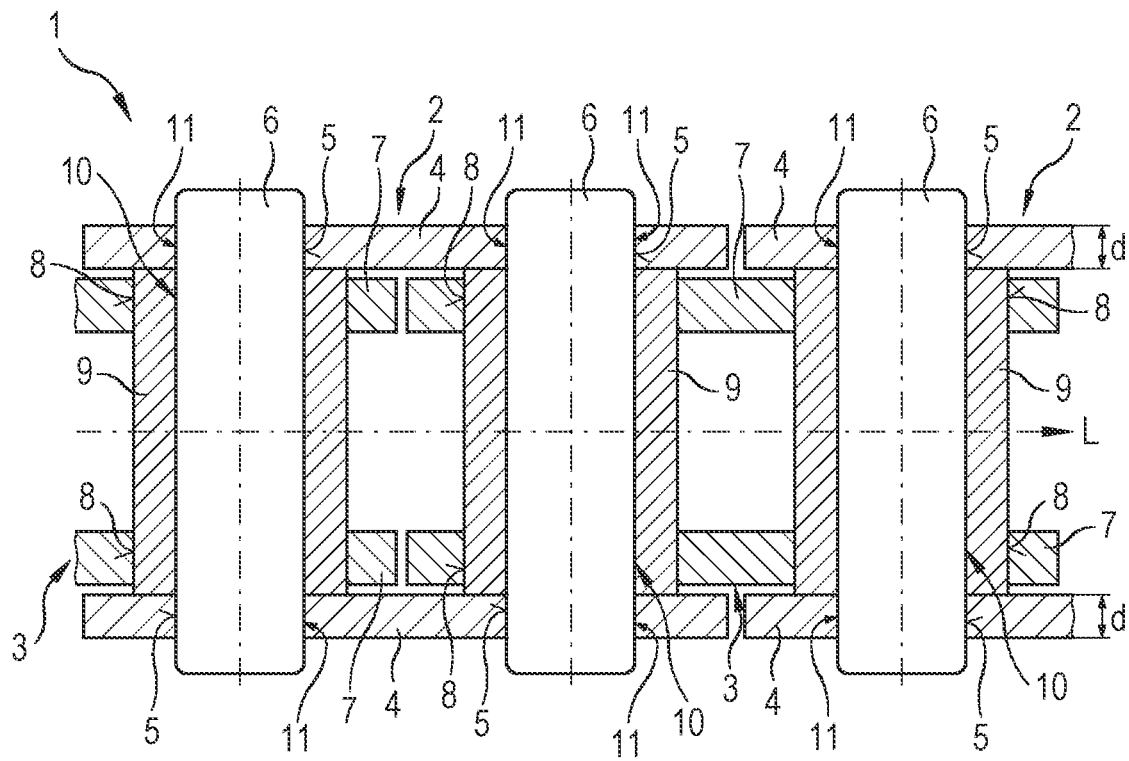
FIG. 3: shows a section through a sleeve chain that includes the inner chain links and outer chain links shown in FIG. 1 and FIG. 2, and FIG. 4: is an enlarged view of a pin of the sleeve chain shown in FIG. 3.

In FIG. 3, a chain 1 is shown in section transverse to its longitudinal direction L. The chain 1 is a sleeve chain and includes alternately arranged outer chain links 2 and inner chain links 3. The inner chain links 3 shown in FIG. 1 and the outer chain links 2 shown in FIG. 2 are connected to each other by the pins 6 of the outer chain links 2 extending through the sleeves 9 of the inner chain links 3. The pins 6 and the sleeves 9 therefore form the chain joints 10.

A joining chamfer 12 is formed in the area of each compression connection 11 between the pins 6 and the openings 5 in the outer link plates 4. This joining chamfer 12 is described in more detail below with reference to FIG. 4.

Figure 4:
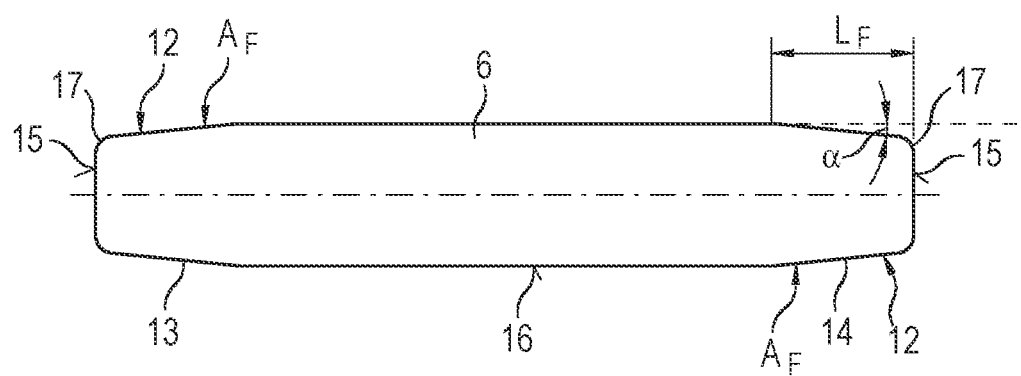
FIG. 4a is an implementation of the pin shown in FIG. 3 having a progressively extending chamfer.
FIG. 4b is an implementation of the pin shown in FIG. 3 having a degressively extending chamfer.
Figure 4A:
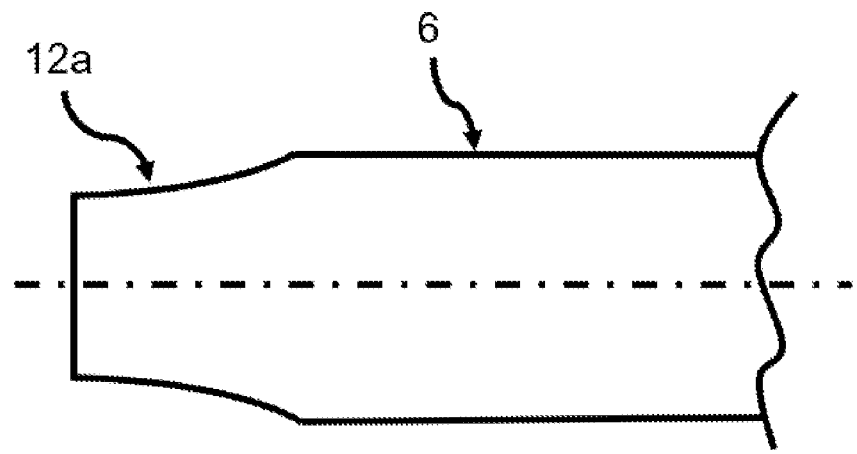
Figure 4B:
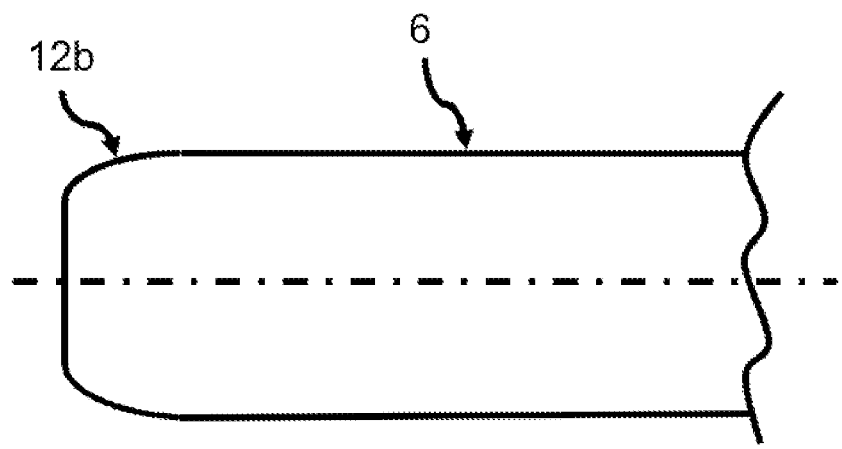

FIG. 4 is an enlarged view of an example of a pin 6 of the chain 1 from FIG. 3. The pin 6 is not to scale. The pin 6 has a joining chamfer 12 at each of its ends 13, 14. The joining chamfers 12 at both ends of the pin 6 are formed identically to each other. As already described, it is also conceivable to form the joining chamfers differently and, if necessary, randomly, i.e. according to a random principle. The joining chamfers 12 are formed in the region of the pin 6 which, in the fully assembled state of the chain 1, is arranged in the openings 5 of the outer link plates 4. The joining chamfer may also extend beyond the outer link plates 4 on both sides. In the present context, a joining chamfer is to be understood as an area of the pin, in which the diameter of the pin decreases so that the assembly of the pins 6 in the respective opening 5 of the outer link plates is facilitated. In the case shown in FIG. 4, the two joining chamfers 12 are formed by a conical taper. Each joining chamfer 12 has a length $L_F$. This length $L_F$ is about 0.4 to 2.5 mm, preferably 0.6 to 1.5 mm. The length $L_F$ of the joining chamfer 12 approximately corresponds to the thickness d of the outer link plates 4. The chamfer angle a of the joining chamfers 12 is in a range of approximately 0.3 to 2°, preferably 0.5 to 1°. In the present case, the chamfer angle is the angle between the extension of the lateral surface of the cylindrical central part of the pin and the peripheral surface of the joining chamfer. As described above, the outer surface AF of the joining chamfer 12 is conical and therefore substantially corresponds to a straight circular truncated cone. However, the outer surface of the joining chamfer need not be an exact conical surface. It is sufficient if the range of chamfer angles described above is observed. A progressive or degressive chamfer (12a, 12b) is then also possible, as shown in FIGS. 4a and 4b, respectively.

The pin 6 is rounded at the transition from its circumferential surface 16 to the two end faces 15. This rounding 17 has a radius r of about 0.4 mm.

An essential element of the invention is that the joining chamfer is formed in the region of the compression connection 11 between the openings 5 of the outer link plates 4 and the regions of the pins 6 arranged in these openings 5. It would therefore also be conceivable for the joining chamfer to be formed in the respective openings of the outer link plates. In this case, the joining chamfer should extend in the same manner as described above with respect to the pin (length, chamfer angle, shape, etc.).

The formation of a joining chamfer described above is not limited to sleeve chains. A corresponding configuration of the pins and/or the openings in the outer link plates is also conceivable in roller chains, in which a roller is additionally arranged on each of the sleeves of a chain described above. Also in the case of chains, in which the inner chain links are seated directly on the pins, for example toothed chains or cradle-type link chains, a corresponding configuration of the connection between the pins and the outer link plates is advantageous.

The configuration of the pins of the chains according to the invention, described above in particular with reference to FIG. 4, enables better centering of the pins in the openings of the outer link plates. Unfavorable placement of the pins on the outer link plates during assembly, which is known from the prior art and which may lead to severe deformation of the outer link plates up to material punching out on the outer link, is avoided. This also leads to an improvement in the fatigue strength of the chains.

LIST OF REFERENCE SIGNS

1 Chain
2 Outer chain link
3 Inner chain link
4 Outer link plate
5 Openings of outer link plate
6 Pin
7 Inner link plate
8 Openings of inner link plate
9 Sleeve
10 Chain joint
11 Press connection
12 Joining chamfer
13 End of pin
14 End of pin
15 End face of pin
16 Circumferential surface of pin
17 Rounding
L Longitudinal direction of chain
$L_F$ Length of joining chamfer
A Chamfer angle
d Thickness of outer link plates
$A_F$ Outer surface of chamfer

The invention claimed is:

1. A chain for a chain drive comprising alternating inner chain links and outer chain links, each of which is articulated to each other by a chain joint, wherein each outer chain link comprises two outer link plates each having two openings and two pins, and wherein the pins and the openings are each connected to one another by a compression connection, so that the pins hold the outer link plates spaced apart from one another, wherein a joining chamfer is formed in the region of the compression connection between the pins and the openings in the outer link plates, and wherein the joining chamfer is an area of the pins and/or the openings in which the diameter of the pins and/or the openings decreases in a direction towards each end of the pins.

2. The chain according to claim 1, wherein the joining chamfer is part of the compression connection between the pins and the openings in the outer link plates.

3. The chain according to claim 1, wherein the joining chamfer is formed on the pins.

4. The chain according to claim 1, wherein the length ($L_F$) of the joining chamfer is about 0.4 to 2.5 mm.

5. The chain according to claim 1, wherein the length ($L_F$) of the joining chamfer corresponds approximately to the thickness (d) of the outer link plates.

6. The chain according to claim 1, wherein the pins have a joining chamfer at both ends.

7. The chain according to claim 1, wherein the chamfer angle ($\alpha$) of the joining chamfer is about 0.3° to 2°.

8. The chain according to claim 1, wherein the joining chamfer extends linearly.

9. The chain according to claim 1, wherein the joining chamfer extends progressively.

10. The chain according to claim 1, wherein the joining chamfer extends degressively.

11. The chain according to claim 1, wherein the pins are rounded at both ends at the transition from their end faces to their circumferential surface.

12. A pin for a chain according to claim 1, wherein joining chamfers are formed at both ends.

13. The chain according to claim 1, wherein the length ($L_F$) of the joining chamfer is about 0.6 to 1.5 mm.

14. The chain according to claim 1, wherein the chamfer angle ($\alpha$) of the joining chamfer is about 0.5° to 1°.

15. A chain for a chain drive comprising alternating inner chain links and outer chain links, each of which is articulated to each other by a chain joint, wherein each outer chain link comprises two outer link plates each having two openings and two pins, and wherein the pins and the openings are each connected to one another by a compression connection, so that the pins hold the outer link plates spaced apart from one another, wherein a joining chamfer is formed in the region of the compression connection between the pins and the openings in the outer link plates, and wherein the length ($L_F$) of the joining chamfer corresponds approximately to the thickness (d) of the outer link plates.

* * * * *